United States Patent [19]

Röhm

[11] Patent Number: 4,703,942
[45] Date of Patent: Nov. 3, 1987

[54] HAMMER DRILL

[76] Inventor: Günter H. Röhm, Hienrich-Röhm-Str. 50, 7927 Sontheim, Fed. Rep. of Germany

[21] Appl. No.: 839,789

[22] Filed: Mar. 13, 1986

[30] Foreign Application Priority Data

May 8, 1985 [DE] Fed. Rep. of Germany ....... 3516451

[51] Int. Cl.$^4$ ...................... B23B 31/04; B25D 17/08
[52] U.S. Cl. .................................... 279/19.4; 173/48; 279/62
[58] Field of Search ................................ 279/19–19.7, 279/60–65, 75; 173/48; 408/239 R, 239 A

[56]  References Cited

U.S. PATENT DOCUMENTS

| 2,684,856 | 7/1954 | Stoner | 279/61 |
| 3,985,368 | 10/1976 | Better et al. | 279/75 |
| 4,131,165 | 12/1978 | Wanner et al. | 279/19.3 |
| 4,491,444 | 1/1985 | Rumpp et al. | 173/48 |
| 4,502,824 | 3/1985 | Dohse et al. | 173/48 |

FOREIGN PATENT DOCUMENTS 2826153 12/1979 Fed. Rep. of Germany ........ 279/19
3413581 10/1985 Fed. Rep. of Germany .

Primary Examiner—Z. R. Bilinsky
Attorney, Agent, or Firm—Karl F. Ross; Herbert Dubno

[57] ABSTRACT

A drill chuck can be operated with or without an axial displacement mode with respect to the drill spindle. For operation without the axial displacement mode, lock formations can be moved by way of a coupling ring to engage with a seat portion of a contact sleeve which is fixed to the drill spindle. The lock formations are part of resilient lock strips which are cut from the wall of a lock sleeve secured at the chuck body. The lock formations can be contacted by control projections of the coupling ring. The coupling ring can be moved in axial direction towards the drill spindle so that the contact sleeve is secured due to engagement of the lock formations at the seat portion. At the same time, the chuck body contacts at a spring ring secured to the contact sleeve, and the relative axial movements between the chuck body and the contact sleeve or the drill spindle cannot take place.

20 Claims, 4 Drawing Figures

HAMMER DRILL

CROSS REFERENCE TO RELATED APPLICATION

This application is related to my commonly owned copending application Ser. No. 839,421 and Ser. No. 839,422 and the following additional applications:

| Ser. No. | Filing Date |
|---|---|
| 808,894 | 13 December 1985 |
| 808,891 | 13 December 1985 |
| 808,893 | 13 December 1985 |
| 788,775 | 18 October 1985 |
| 744,795 | 13 June 1985 |
| 702,049 | 15 February 1985 |
| 702,053 | 15 February 1985 |
| 686,243 | 26 December 1984 |
| 743,583 | 11 June 1985 |
| 658,133 | 5 October 1984 |
| 726,596 | 23 April 1985 |
| 726,587 | 23 April 1985 |
| 731,655 | 7 May 1985 |
| 719,760 | 4 April 1985 |
| 720,259 | 5 April 1985 |
| 703,888 | 21 February 1985 |
| 654,792 | 26 September 1984 |
| 654,791 | 26 September 1984 |
| 591,975 | 21 March 1984 | and the applications referred to therein.

FIELD OF THE INVENTION

My present invention relates to a percussion drill and, more particularly, to percussion or hammer drill wherein the drill chuck is mounted on a drill spindle for rotation therewith, and in which the drill spindle has a longitudinal axial passage through which the impact force of a central shaft or rod is imparted to the drill bit which is held in the drill chuck between centrically adjustable chuck jaws. The spindle can be driven by an electric motor or a prime mover such as an internal combustion engine.

BACKGROUND OF THE INVENTION

In such apparatus the central shaft can be axially guided in the hollow drill spindle, and at least one coupling element or key can be provided for connecting the drill chuck to the drill spindle. The coupling element can be arranged in retainers (recesses or pockets) of the drill spindle and in retainers in the chuck body of the drill chuck. As a function of its setting, the coupling element, however, will allow an operating mode in which an axial play or displacement is possible for the chuck body relative to the drill spindle, and this can be eliminated by a locking mechanism having a coupling ring.

As described in the aforementioned applications the locking mechanism can include a lock or latch element, and this can be selectively brought into a recess in the contact ring, with the lock element being actuated by the respective coupling ring which can be axially displaced but which can be secured so as not to rotate. The lock element can be moved in radial direction towards the chuck axis into a respective lock retainer.

At its rim which is directed towards the control ring, the coupling ring can have teeth which can engage in matching teeth of the control ring when the coupling ring has been moved axially towards the drill end. A control ring is provided between the chuck body and the coupling ring there, and this control ring is secured to the drill spindle.

The control sleeve carries at its interior surface a snap ring which can radially project into an annular groove of the chuck body and the snap ring, accordingly, forms an abutment which limits the axial displacement for the two lateral surfaces or flanks of the annular groove which is adapted in width to the axial displacement.

The lock element can be a ball, eg. a steel ball, which can be radially displaced and guided in a recess at the contact sleeve. In the axial direction towards the drill, corresponding to the mode without axial displacement of the chuck with respect to the drill spindle, the coupling ring pushes the ball into the annular groove of the chuck body, so that it serves as a second abutment. Consequently, the ball is in positive contact at the one side of the groove, and the spring ring which is secured at the contact sleeve is in positive contact at the other side of the annular groove. Thus, the chuck body cannot be axially displaced with respect to the contact sleeve which is secured at the drill spindle.

The abutment provided by the ball provides only a single point-contact with corresponding high-area contact pressure, and the danger that deformations can occur can arise. This, in turn, can detrimentally affect the axial securement, i.e. locking and tightening, achieved by the ball between the chuck and the contact sleeve, and may lead, furthermore, to loosening of the desired connection. This may be especially disruptive, however, when only rotary drilling operations are carried out.

OBJECTS OF THE INVENTION

It is the principal object of the invention to extend principles of the concurrently filed and earlier applications mentioned above.

It is another object of this invention to provide a percussion drill apparatus wherein a positive connection is readily achieved between the chuck body and the contact sleeve.

It is also an object of my invention to provide a percussion drill apparatus in which the axial displacement of the chuck with respect to the drill spindle is positively precluded when so desired.

SUMMARY OF THE INVENTION

These and other objects are attained in an assembly of the type described previously wherein the lock recess is an annular seat portion at the outer side of the contact sleeve, and that there is provided a lock sleeve which is at least axially secured at the chuck body. This lock sleeve extends from the drill end of the chuck into the annular space between the contact sleeve and the coupling ring, and the lock sleeve comprises a lock blade, tongue or similar projection pointing at least in the direction of the drill spindle. This lock tongue carries at the inner side the lock element which can be shaped as a radial lock nose.

When the coupling ring is axially displaced in the direction of the drill spindle, i.e. upwardly for downward drilling, the lock tongue is in contact with the annular seat portion, i.e. the lock nose engages the annular seat portion, and the tongue or blade can be flexed or retracted radially outwardly until the lock nose is released from the annular seat portion, when the coupling ring is axially displaced towards the drill bit (down).

Three lock tongues can be provided advantageously in uniformly spaced relationship about the chuck circumference. They can, accordingly, in conjunction with the coupling ring which can actuate them, act in concert and in the manner of a clamping pliers at the contact sleeve.

This provides for a secure and positive connection between the contact sleeve on the one hand, and the lock sleeve, as well as the chuck body which is axially secured to the lock sleeve.

In accordance with a preferred embodiment, the lock tongue is a radially outwardly resilient portion which has been cut from the lock sleeve, and this is pretensioned and adapted to contact at a control projection of the coupling ring.

It is also preferred that the annular surface which comes in contact with the lock nose or projection is approximately a conical surface and the associated contact surface of the lock projection is correspondingly inclined in consideration of the angle of the cone. This will allow the option that the clamping assembly as formed by the lock projections and their lock elements, can be particularly advantageously tightened by way of the wedge-like or conical contact surfaces.

In accordance with a preferred embodiment, there is provided an annular space between the lock sleeve and the coupling ring, and a spring can be arranged in this annular space which urges the coupling ring into the position towards the drill bit (down). The spring is mounted so as to extend axially between an annular shoulder of the coupling ring and a support ring for the lock sleeve.

The control projection is preferably provided by a snap or spring ring which is inserted in an annular groove in the coupling ring.

The coupling ring is preferably guided at the lock sleeve by way of the support ring and the snap ring which provides the control projection.

BRIEF DESCRIPTION OF THE DRAWING

The above and other objects, features and advantages of my present invention will become more readily apparent from the following description, reference being made to the accompanying drawing, in which.

SPECIFIC DESCRIPTION

Figure 1:
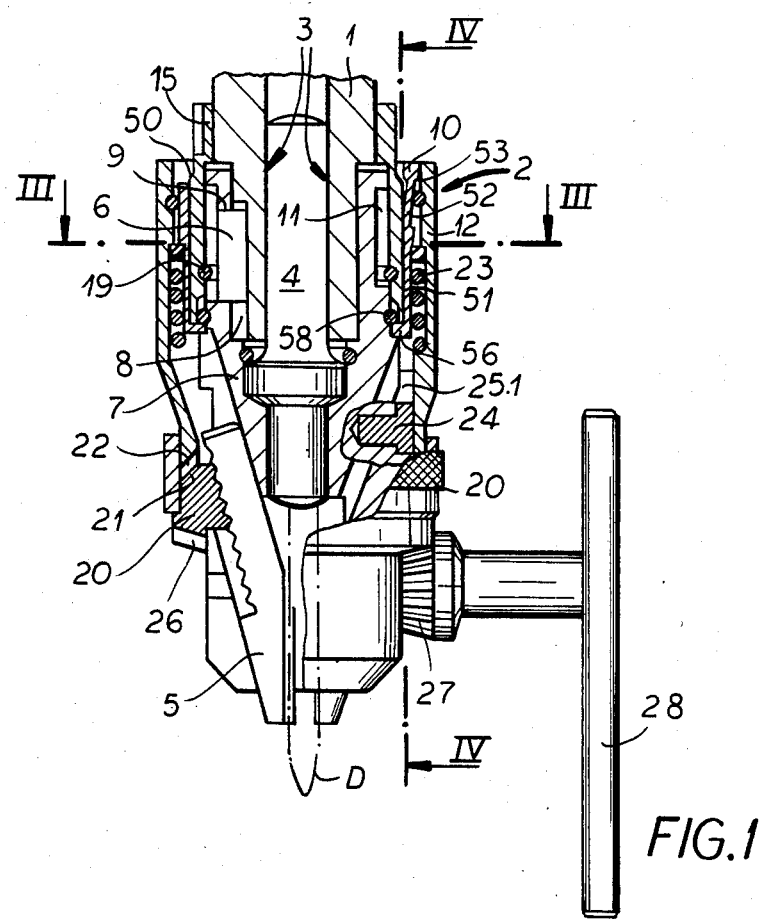
FIG. 1 shows a percussion drill apparatus according to the invention in longitudinal axial cross section and in part in diagrammatic side elevation.
Figure 4:
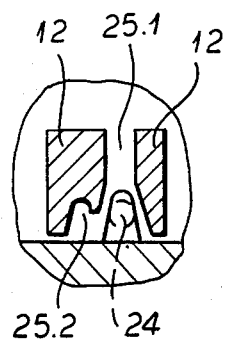
FIG. 4 is a cross-sectional view through the drill in the direction of line IV—IV in FIG. 1, and in the mode in which axial displacement of the drill chuck on the drill spindle is permitted.
Figure 3:
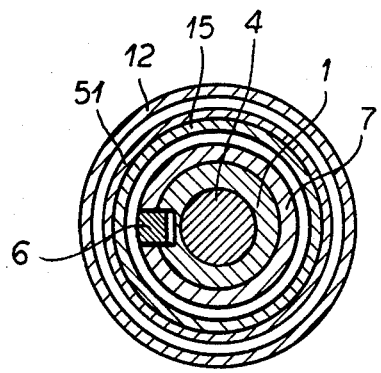
FIG. 3 is a cross-sectional view through the drill in the direction of line III—III in FIG. 1.

The percussion drill apparatus shown in the drawing comprises a drill spindle 1 of which only the lower portion is shown in the drawing. A drill chuck, generally identified by the reference numeral 2, is keyed to the drill spindle 1 so as to rotate therewith. The chuck 2 has a central axial passage 3 through which the percussion or impact action or stroke of a central rod 4 is transferred or imparted to the end of the respective drill bit D which can be gripped by the jaws 5. The chuck jaws 5, in turn, can be centrically adjusted by way of the control ring 20. The anvil or central shaft 4 is axially guided in the hollow drill spindle 1, and it is also only shown in part in FIG. 1.

The drill chuck 2 rotates with the drill spindle 1 because of coupling elements 6 which, when considered in the direction of rotation, engage positively into coupling retainers or pockets 8 and 9 which are respectively formed in the drill spindle 1 and in the drill chuck 2. The coupling element 6 allows the mentioned axial displacement of the chuck 2 at the drill spindle 1, and which can be prevented or permitted by a locking mechanism having at least one lock nose or projection 10, and with a coupling ring 12.

The lock projection 10 can be actuated by the coupling 12 which, in turn, can be axially displaced but which can also be held and secured so as not to rotate. Accordingly, the lock projection 10 can be moved radially with respect to the central longitudinal chuck axis, and it can be fixed at an annular seat portion 50 of the contact sleeve 15.

At its rim which is directed towards the control ring 20, the coupling ring 12 is equipped with teeth 21 which can engage in matching teeth 22 of the control ring 20 when the coupling ring is axially displaced in the direction towards the drill (down), and undesirable rotation of the control ring 20 is then precluded.

A control or contact sleeve 15 is arranged between the chuck body 7 and the coupling ring 12, and this control sleeve 15 is secured at the chuck body at least axially by way of a threaded socket or portion.

The control sleeve 15 carries at its inner side a snap or spring ring 19 which projects radially into an annular groove 11 of the chuck body 7. This snap ring 19 can act as the abutment for the two flanks 11.1 and 11.2 of the annular groove 11 which is adapted in its length to the axial displacement.

A lock sleeve 51 is provided at the chuck body 7, and it is axially fixed thereat. The lock sleeve 51 is secured with a collar portion 56 at the seat portion 57 of the chuck body 7. The respective connection is secured by a snap or spring ring 58 which, in turn, is secured at the chuck body 7.

Figure 2:
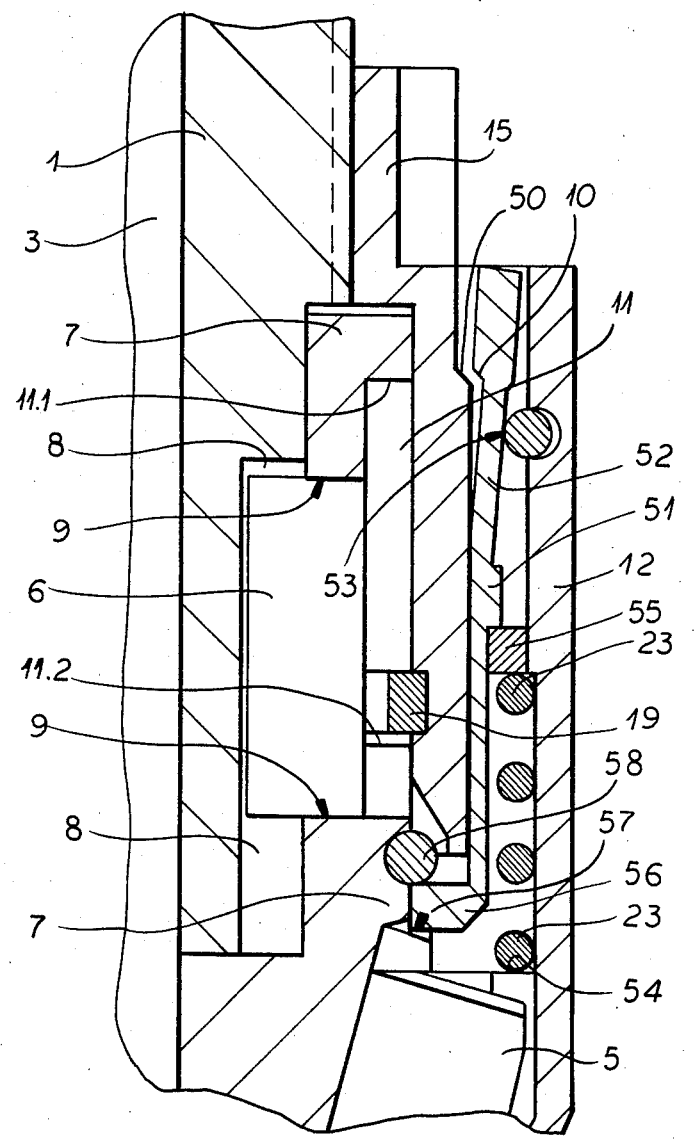
FIG. 2 is a detail showing in larger scale the operation of the lock element of the embodiment of FIG. 1, but in the mode for axial displacement of the drill chuck on the drill spindle.

The lock sleeve 51 extends from a point near the drill bit in the chuck, i.e. from its collar 56, into the annular space between the contact sleeve 15 and the coupling ring 12, and up to the terminus of the coupling ring 12, see particularly FIG. 2. The lock sleeve 51 carries three lock projections, or blades or tongues, which are uniformly arranged about the chuck circumference. They project in the direction of the drill spindle 1 (up), and they respectively carry lock projections or noses 10.

When the coupling ring is axially disposed towards the drill spindle (up), the lock blades 52 are held in the radially inwardly moved position and with the annular seat portion 50 being contacted by the lock noses 10, or projections or formations. This corresponds to the operation in which no axial displacement of the drill chuck at the drill spindle is used. However, when the coupling ring 12 is axially displaced towards the drill D (down) as is indicated in the drawing, the lock blades 52 can be moved radially outwardly until the lock projections 10 are disengaged from the annular seat portion 50, see FIG. 2.

The lock blades 52 are provided by wall portions which are separated by cuts in the wall of the lock sleeve 51, and these form radially outwardly, elastically pretensioned lock blades 52 with lock noses 10. Due to the pretensioning, they can respectively rearwardly contact at a control projection 53 secured at the coupling ring 12.

The annular surface of the annular seat portion 50 which can come in contact with the lock projections 10 is approximately a conical surface, and the associated contact surfaces of the lock projections 10 are correspondingly inclined.

Furthermore, between the lock sleeve 51 and the coupling ring 12 there is available an annular space in which is arranged a spring 23 which urges the coupling ring 12 into the direction towards the drill bit (down), i.e. releasing the axial displacement of the drill chuck. This spring 23 is mounted axially between an annular shoulder 54 of the coupling ring 12 and a support ring 55 of the lock sleeve 51.

The control projection 53 is preferably provided by a snap or spring ring which is inserted in an annular groove in the coupling ring 12.

Together with the support ring 55, this snap ring 53 can guide the coupling ring 12 at the control sleeve 51.

In the impact or percussion drill mode, the coupling ring 12, is positioned as indicated in the drawing, i.e. axially close to the drill bit, in which position it locks the control ring 20 for actuation of the jaws 5, because the coupling ring 12 is maintained against rotation in this position.

This is done by way of the contact head 24 which is fixed at the chuck body 7, and which engages into a cam formation recess or groove 25.1 on the inner wall of the coupling ring 12. When the coupling ring 12 is axially retracted, against the force of spring 23 and rotated to such an extent that the contact head 24 enters into the other cam formation recess or axial groove 25.2 of the coupling ring 12, the coupling ring 12 is held by the contact head 24 in the axial position in which the coupling ring 12 is disengaged from the control ring 20, so that the control ring 20 can be manually rotated.

Alternatively, it can be rotated by means of the key 28 which engages in customary manner with a bevel gear 27 in a bevel gear formation 26 of the control ring 20. In the axially retracted position of the coupling ring 12, the control projections 53 will urge the lock blades 52 radially inwardly, so that the lock formations 10 extend over the annular seat portion 50 and further axial displacement of the chuck body 7 at the drill spindle 1 is precluded. In this condition, i.e. when the lock formation 10 reach over the annular seat portion 50, the snap ring 19 just touches the recess flank 11.2 of the annular groove 11, i.e. the flank which is closest to the drill bit D.

I claim:

1. A percussion drill assembly comprising:
   a hollow percussion drill spindle formed with coupling retainers;
   an impact rod axially disposed and guided in said spindle for imparting a percussion action to a drill bit;
   a drill chuck rotatably entrained with spindle and axially displaceable thereon in a mode with axial displacement and being held against axial displacement in a mode without axial displacement, said drill chuck including a body with an axially directed passage therethrough for transferring the action of said rod to said drill bit, said chuck body being formed with chuck jaws engaging said bit and with coupling retainers cooperating with the retainers of said spindle;
   a control ring for actuating said jaws for gripping and releasing said bit, said control ring having teeth in one face thereof;
   an axially displaceable coupling ring mounted for precluding and enabling axial displacement of said chuck with respect to said spindle, said coupling ring being formed with a rim directed towards said control ring having a plurality of teeth which on axially positioning of the coupling ring towards a drill bit end of the chuck can operatively engage in the teeth of said control ring;
   a contact sleeve between said chuck body and said coupling ring and having annular seat portion at an outer side providing a first lock component; and
   a lock sleeve on said chuck body, extending an effective distance into an annular space left between said contact sleeve and said coupling ring, said lock sleeve having a projecting lock formation providing a second component such that, when said coupling ring is held nearer the drill spindle, said second lock component is held in a radially inwardly directed position such that it effectively contacts said first lock component, and said second lock component can be moved, when said coupling ring is closer to said drill, radially outwardly to be released from said first lock component.

2. The assembly defined in claim 1 wherein said second lock component is actuated by said coupling ring.

3. The assembly defined in claim 1 wherein said chuck body is formed with a groove having an effective length in conformity with the axial displacement of said chuck body at said drill spindle, said assembly further comprising a spring ring secured at the inner circumferential wall of said contact sleeve to provide an abutment for limiting the axial displacement by being adapted to be selectively contacted by a respective flank of said groove.

4. The assembly defined in claim 3 wherein said groove is an annular groove.

5. The assembly defined in claim 1 wherein said second lock component is a strip or similar projection which carries at the inner side the lock formation which is shaped as a radial lock nose.

6. The assembly defined in claim 1 wherein said lock sleeve is secured approximately coterminously with that contact sleeve.

7. The assembly defined in claim 1 wherein at least a portion of said lock sleeve is axially secured at said chuck body.

8. The assembly defined in claim 1 wherein said second lock component points in the direction of said drill spindle.

9. The assembly defined in claim 1 wherein said second lock component is a radially outwardly directed and resilient lock formation cut from the wall of said lock sleeve.

10. The assembly defined in claim 9 wherein said lock formation is pretensioned.

11. The assembly defined in claim 1 and further comprising a control projection at said coupling ring.

12. The assembly defined in claim 11 wherein said control projection is a spring ring which is mounted in an annular groove in said coupling ring.

13. The assembly drfined in claim 1 wherein said first lock component has an inclined annular surface which is adapted to be contacted with the second lock component, and said second lock component including a matching inclined surface.

14. The assembly defined in claim 12 wherein an annular space is provided between said lock sleeve and said coupling ring, and further comprising a spring which urges said coupling ring in the direction towards the respective drill.

15. The assembly defined in claim 14 wherein said spring is disposed between an annular shoulder of said coupling ring and a support ring at said lock sleeve.

16. The assembly defined in claim 15 wherein said coupling ring is guided at said lock sleeve by way of said support ring and said spring ring.

17. The assembly defined in claim 9 wherein three lock formations are provided in uniform spacing about the chuck circumference.

18. The assembly defined in claim 1 wherein the chuck jaws are centrically adjusted by said control ring.

19. The assembly defined in claim 1 wherein said coupling ring is shaped with an interior cam formation recess, further comprising at least one contact head arranged at said chuck body and adapted to operatively extend into a cam formation recess of said coupling ring, wherein said cam formation recess is comprised of two axial grooves which extend adjacent to one another, but each having a distinct length, and which are open when considered in the direction towards said control ring for the entry of said at least one contact head, wherefore said coupling ring can be turned on the chuck body to such an extent that either one or the other of the two grooves is axially aligned with said at least one contact head.

20. The assembly defined in claim 19 wherein said at least one contact head includes at least one leg extending in the longitudinal direction of said grooves, and wherein the walls of said at least one leg from contact surfaces for the respective lateral walls of said grooves.

* * * * *